US 6,637,104 B1

(12) United States Patent
Masuda et al.

(10) Patent No.: US 6,637,104 B1
(45) Date of Patent: Oct. 28, 2003

(54) CABLE MANAGEMENT SYSTEM FOR ELECTRONIC DEVICES SUCH AS FLAT PANEL MONITORS

(75) Inventors: Kuni Masuda, Cupertino, CA (US); Joe Miseli, San Bruno, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 10/263,050

(22) Filed: Oct. 1, 2002

Related U.S. Application Data

(62) Division of application No. 10/096,349, filed on Mar. 11, 2002.

(51) Int. Cl.[7] .............................. E04G 3/00; H04N 5/655
(52) U.S. Cl. .................... 29/832; 174/72 A; 248/917; 248/921; 248/923; 361/681
(58) Field of Search ............... 29/832; 174/72 A, 174/135, 138 E; 361/680, 681, 683; 248/917–923

(56) References Cited

U.S. PATENT DOCUMENTS

| | | | | |
|---|---|---|---|---|
| 4,669,694 A | * | 6/1987 | Malick .................. 248/397 |
| 5,229,757 A | * | 7/1993 | Takamiya et al. ........... 345/168 |
| 5,769,369 A | * | 6/1998 | Meinel .................. 248/176.1 |
| 5,812,368 A | * | 9/1998 | Chen et al. ............... 361/681 |
| 6,061,104 A | * | 5/2000 | Evanicky et al. ............ 248/274.1 |
| 6,168,124 B1 | * | 1/2001 | Matsuoka et al. ............ 248/176.1 |
| 6,229,584 B1 | * | 5/2001 | Chuo et al. ............... 349/58 |
| 6,268,997 B1 | * | 7/2001 | Hong .................... 361/681 |
| 6,307,530 B1 | * | 10/2001 | Cho ..................... 345/87 |
| 6,392,873 B1 | * | 5/2002 | Honda ................... 361/681 |
| 6,411,271 B1 | * | 6/2002 | Bang et al. ............... 345/87 |
| 6,464,185 B1 | * | 10/2002 | Minelli et al. .............. 248/183.1 |
| 6,478,275 B1 | * | 11/2002 | Huang ................... 248/284.1 |
| 6,484,994 B2 | * | 11/2002 | Hokugoh ................. 248/371 |
| 6,543,734 B2 | * | 4/2003 | Yeh ...................... 248/291.1 |

OTHER PUBLICATIONS

"The Titan Series for LCD Monitors", [internet] http://www.icwusa.com/titan.html, pp. 1–4, Printed Mar. 3, 2002.

* cited by examiner

Primary Examiner—Dean A. Reichard
Assistant Examiner—Adolfo Nino
(74) Attorney, Agent, or Firm—O'Melveny & Myers LLP

(57) ABSTRACT

A system for managing cables is disclosed herein. A preferred aspect of the system comprises a flat panel monitor having a front surface, a rear surface, a left side surface and a right side surface. The system also comprises a plurality of downwardly facing cable portals coupled to the rear surface of the flat panel monitor and a stand coupled to the rear surface of the flat panel monitor, wherein the flat panel monitor is forwardly rotatable on said the on a horizontal axis; and a plurality of releasably connectable retaining member are coupled to the rear surface of the flat panel monitor.

10 Claims, 3 Drawing Sheets

CABLE MANAGEMENT SYSTEM FOR ELECTRONIC DEVICES SUCH AS FLAT PANEL MONITORS

CROSS-REFERENCE TO RELATED APPLICATIONS

This application is a divisional of application serial number 10/096,349, filed on Mar. 11, 2002, now pending.

BACKGROUND

1. Field of the System

The present invention relates to electronic devices with portals for attaching various other electronic devices using cables. More specifically, the present system relates to a system for cable management for liquid crystal display (LCD) or other flat panel monitors, or other electronic devices.

2. Background of the System

Various electronic devices such as computer monitors including both flat panel and cathode ray tube (CRT) displays, video players and recorders, televisions and the like require cables to connect these devices to other components in the particular system. For instance, a typical computer has a monitor, a hard drive storage system, a keyboard, mouse, etc. A monitor itself can have multiple cables for connection to the computer hard drive, speakers, a video player, a video camera, digital video input, etc. It may even include serial port hubs for easy interconnection of interface devices, such as keyboards or mice.

A computer monitor with multiple cable portals and multiple cables dangling can be unsightly and even dangerous. Dangling cables can interfere with usability. The cables may also be dangerous because if multiple cables are hanging to the floor in a disorderly fashion they may cause a person to trip and fall over them or cause damage to equipment by being ensnared. In addition, the cable portals are usually on the back of a computer monitor such that when a cable is attached the cable sticks straight out from the back of the monitor. This can make it difficult to place a monitor close to a wall or in a console or when mounting several adjacent computers, etc.

BRIEF DESCRIPTION

A system for managing cables is disclosed herein. A preferred aspect of the system comprises a flat panel monitor having a front surface, a rear surface, a left side surface and a right side surface. The system also comprises a plurality of downwardly facing cable portals coupled to the rear surface of the flat panel monitor enclosure and a support member coupled to the rear surface of the flat panel monitor through a rotatable joining member, wherein the flat panel monitor is forwardly rotatable on the rotatable joining member on a horizontal axis. In another aspect of the disclosed system, the rear surface of the flat panel monitor may be coupled to a wall through a wall mounting device, the cable portals are then accessed from below the device. A plurality of releasably connectable retaining members are coupled to the rear surface of the flat panel monitor.

An aspect of the above disclosed system comprises a flat and thin flat panel monitor assembly with a rear surface that has an upper substantially planar surface and a lower substantially planar surface perpendicular to the right side surface and the left side surface. The upper planar surface of the flat panel monitor has greater depth than the lower planar surface and the bottom of the upper planar surface has a plurality of downwardly facing cable portals. Finally, the lower planar rear surface of the monitor assembly may have one or a plurality of releasably connectable retaining members.

The disclosed method comprises providing a monitor head assembly that may be disposed on a support member connected by a rotatable joining member. The rear of the flat panel monitor is situated facing the user and the bottom of the display head is rotated towards the user while the top of the top is rotated away from the user. Next, the user accesses the downwardly facing cable portals located on the bottom surface of the upper planar surface on the rear of the flat panel monitor. Next, cables are coupled between the downwardly facing cable portals and the releasably connectable retaining members located on the lower planar surface of the rear of the flat panel monitor assembly. The cables are placed in a horizontal direction along the releasable retaining member or members such that the cables are arranged in an orderly fashion.

DETAILED DESCRIPTION

Those of ordinary skill in the art will realize that the following description of the present system is illustrative only and not in any way limiting. Other embodiments will readily suggest themselves to such skilled persons having the benefit of this disclosure.

Similar designations used herein are intended to designate substantially similar matter.

Figure 1:
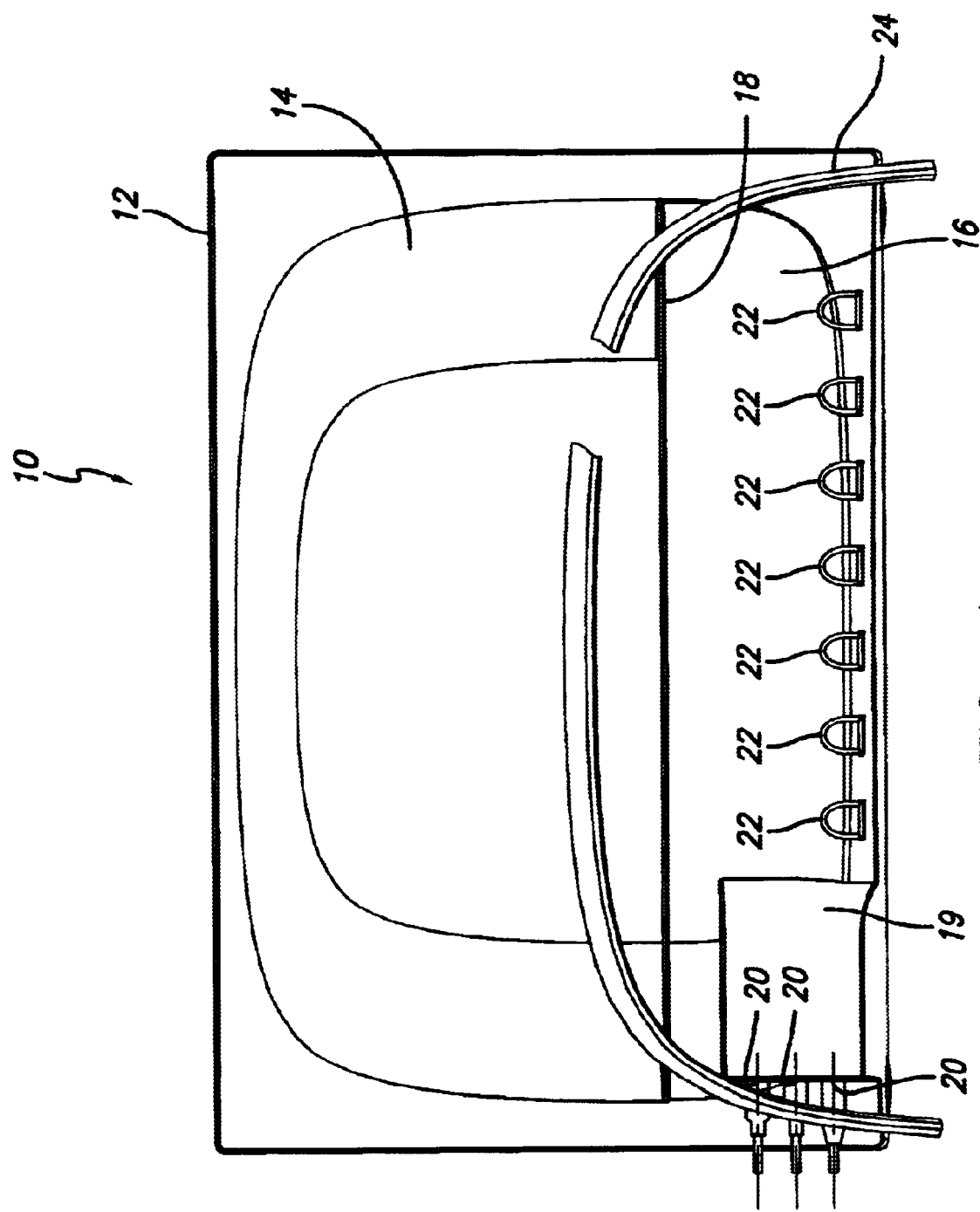
FIG. 1 shows the cable management system according to the present system.

FIG. 1 showing a cable management system 10 configured for use the teachings of this disclosure. The embodiment depicted in FIG. 1 is deployed on a flat panel monitor, though this is but one illustrative example of a disclosed system. As will be appreciated by those of ordinary skill in the art having the benefit of this disclosure, the disclosed system may be used on any variety of electronic devices requiring cable connections to other electronic devices. FIG. 1 is shown as an illustrative example only and in no way limits the disclosed system.

FIG. 1 shows a rear view of a flat panel monitor having cable management system 10 of the disclosed system. Rear surface 12 of the flat panel monitor comprises an upper planar surface 14 and a lower planar surface 16. In one aspect of the present system, upper planar surface 14 has a greater front to back width than lower planar surface 16.

Upper planar surface 14 of rear surface 12 of the flat panel monitor has a bottom surface 18. Disposed on bottom surface 18 of upper planar surface 14 are a plurality of downwardly facing cable portals. The plurality of downwardly facing cable portals will be discussed in greater detail below.

Disposed on lower planar surface 16 of rear surface 12 of the flat panel monitor are a plurality of releasably connectable retaining members 22. In another aspect of the disclosed system, there may only be a single continuous releasably connectable retaining member 22.

Releasably connectable retaining members 22 should be formed from any resilient, semi-rigid to rigid material. For example, releasably connectable retaining members 22 may be formed from stainless steel. However, releasably connectable retaining members 22 can be formed from any number of resilient materials such as plastic or aluminum. In addition, retaining members can be fixed to the electronic device, such as built in clips or they can be removable. They can also be designed to wrap around the cables completely or designed more like hooks such that the cables lay on top of the retaining members. They may have spring-type mechanisms to allow for closure around any cables lain within them. In another aspect of the disclosed system, releasably connectable retaining member 22 may be a single continuous member having a length substantially the same or similar to the electronic device.

Lower planar surface 16 also comprises raised portion 19. Disposed on one side of raised portion 19 are universal serial bus (USB) portals 20.

Also shown in FIG. 1 is a stand or support member 24 coupled to flat panel monitor 12 head assembly by a rotatable joining member. Support member 24 and rotatable joining member will be discussed in greater detail below.

Figure 2:
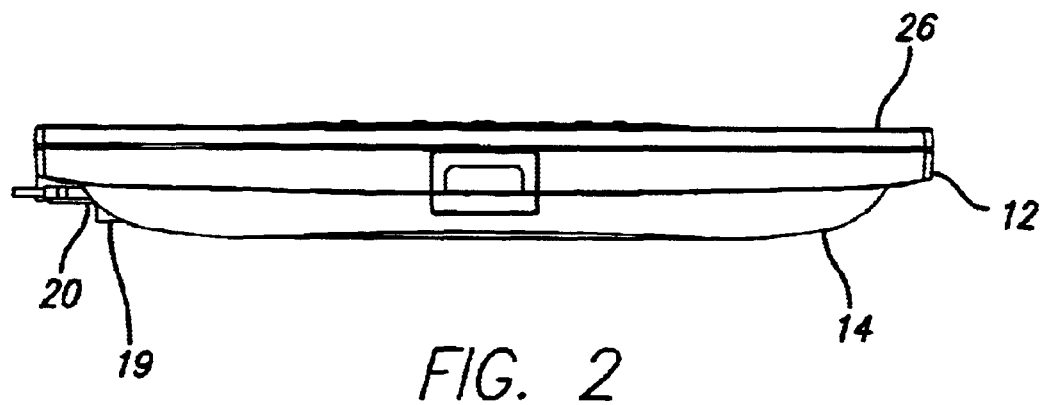
FIG. 2 is a top view of the cable management system according to the present system.

FIG. 2 is a top view of cable management system 10 comprising a flat panel monitor with a front surface 26, rear surface 12 and upper planar surface 14. As shown more clearly in FIG. 2 and as discussed above, upper planar surface has a greater width than rear surface 12. Also disclosed in FIG. 2 are USB portals 20 disposed on raised surface 19.

Figure 3:
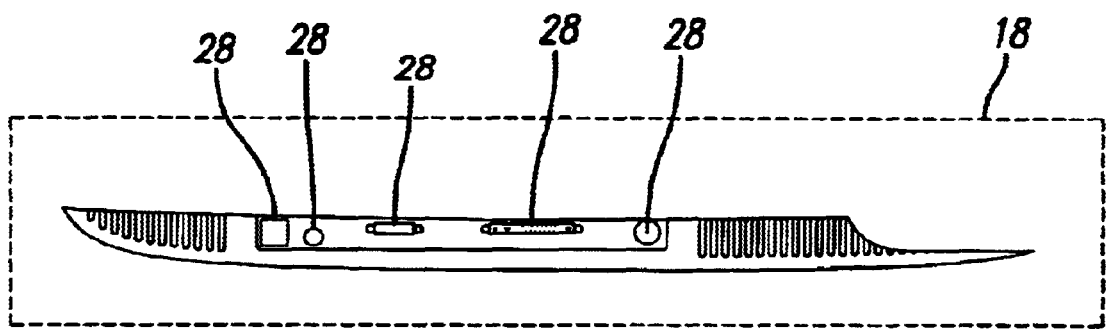
FIG. 3 is a bottom view of one portion of the cable management system of the present system.

FIG. 3 shows bottom surface 18 of upper planar surface 14. Disposed on bottom surface 18 are cable portals 28 for various types of cables. As known to those of ordinary skill in the art, cable portals 28 can include portals for various types of cables. For example, cable portals 28 may be designed to accommodate audio cables, video cables, computer cables, power cables or any type of cable or adapter that is needed to operate or to be coupled to the device. As shown in FIGS. 1 and 3, cable portals 28 are disposed in such a way that they are downwardly facing when the display 12 is in use. Upper planar surface 14 is disposed on approximately the upper two-thirds of rear surface 12 of the flat panel monitor. Thus, in the present example cable portals 28 are located slightly below the center of rear surface 12 and can be easily accessed by the user of the electronic device, in this case, the flat panel monitor, when the electronic device is rotated on rotating joining member along a substantially horizontal axis. The electronic device is rotated such that the bottom of the device is rotated towards the user while the top of the device is rotated away from the user. This allows for easy access to cable portals 28 by the user.

In another aspect of the disclosed system, the flat panel monitor may be mounted to a wall or other solid surface. In this case, cable portals 28 are disposed in such a way that they are downwardly facing when the display 12 is in use. Upper planar surface 14 is disposed on approximately the upper two-thirds of rear surface 12 of the flat panel monitor. Thus, in the present example cable portals 28 are located slightly below the center of rear surface 12 and can be easily accessed by the user of the electronic device, in this case, the flat panel monitor, from below the electronic device because of its location on a wall or other solid surface.

Figure 4:
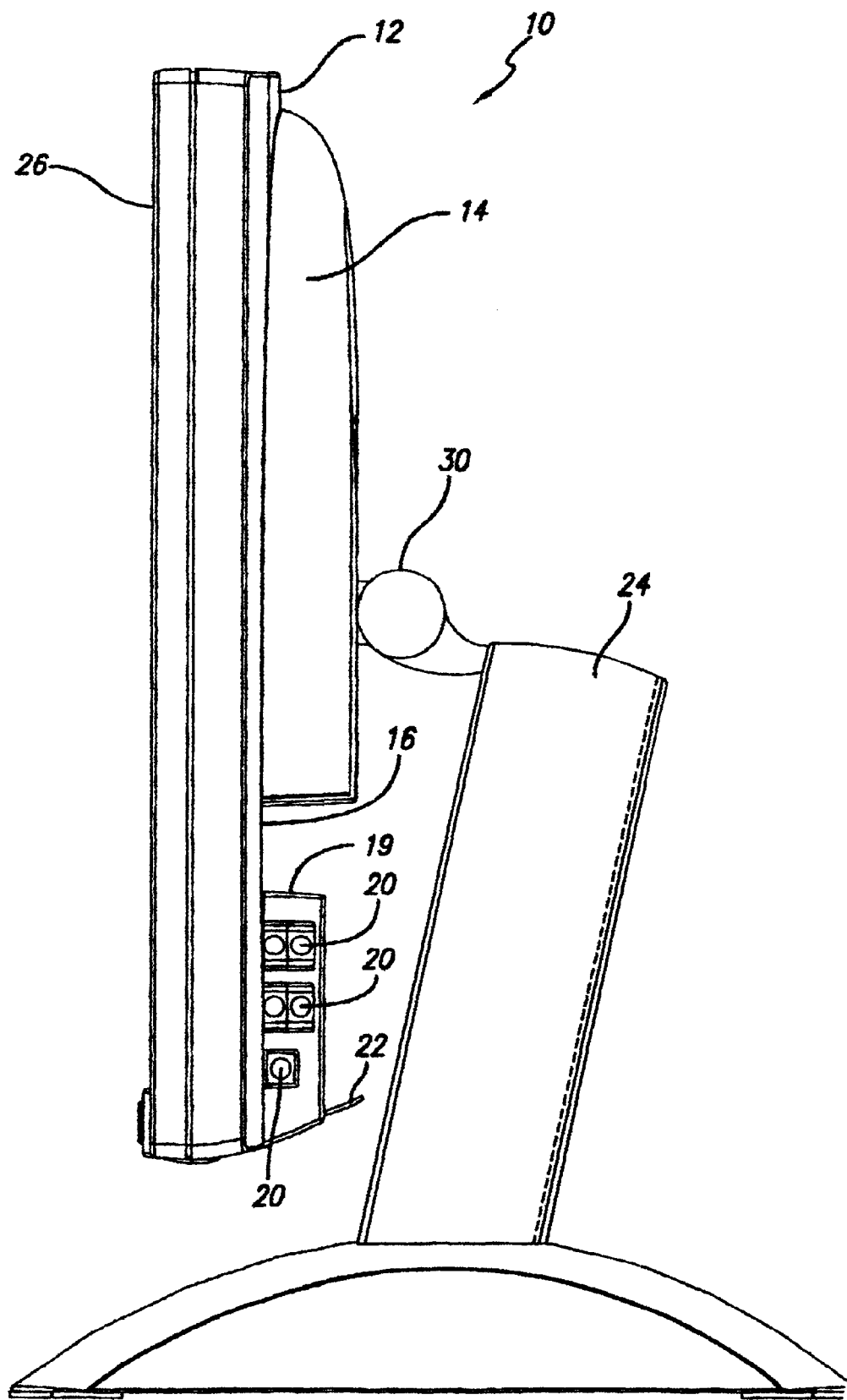
FIG. 4 is a side view of the cable management system of the present system.

FIG. 4 is a side view of the cable management system 10 of the present system. For illustrative purposes, cable management system 10 is shown as used on a flat panel monitor. Flat panel monitor has a front surface 26 and a rear surface 12. Disposed on rear surface 12 is an upper planar surface 14. As discussed previously, upper planar surface has a greater width than lower planar surface 16.

Disposed on lower planar surface 16 is raised surface 19. In the present example, raised surface 19 has a plurality of USB portals 20 that may or may not be included in the disclosed invention. Also disposed on lower planar surface 16 are a plurality of releasably connectable retaining members. As seen clearly in FIG. 4, releasably connectable retaining members 22 may be hook shaped to hold cables from any of the above mentioned cable portals 28 or USB portals 20 or any other cables in proximity to the flat panel monitor or electronic device. It can also be used for containment of any other cables used within proximity to the flat panel monitor, which might pass across it. It is contemplated that the retaining members 22 may comprise any shape suitable for retaining cables in place. For example, it is contemplated that the retaining members may include a hook shape, or frictional ridges to more securely hold the cables in place including a single continuous releasably connectable retaining member.

Also shown in FIG. 4 is support member 24. Support member 24 is coupled to the rear head assembly of flat panel monitor 12 though rotatable joining member 30. In another aspect of the disclosed system, the flat panel monitor or other electronic device may be coupled to a wall or other solid surface.

A method of cable management will now be disclosed. In one aspect, a method may comprise the following steps. It is to be understood that the following acts may be accomplished in a variety of manners using a wide array of equipment. For this embodiment, the method will be illustrated using the flat panel monitor as disclosed above, but the following method may be performed using structure other than that illustrated here, or in a different order, without departing from the scope of this disclosure. First, rear surface of flat panel monitor 12 is situated facing the user. Rear surface of flat panel monitor 12 is rotated on rotatable joining member 30 on a substantially horizontal axis so that the bottom half of the flat panel monitor is rotated towards the user and the top half of the monitor is rotated away from the user such that cable portals 28 on the bottom surface 18 of upper planar surface 14 are facing the user. Once cable portals 28 are facing the user, the user can insert cables into cable portals 28.

In another aspect of the disclosed system, the flat panel monitor is coupled to a wall or other solid surface. In this aspect, cable portals 28 are accessed from below the flat panel monitor.

Next the cables are placed into releasable retaining members 22 so that the cables are situated along a substantially horizontal axis and held in place by releasable retaining members 22. Next, rear surface of flat panel monitor 12 is rotated so that the bottom of the flat panel monitor is rotated away from the user and the top of the flat panel monitor is rotated towards the user. Rear surface of flat panel monitor 12 is rotated in this manner until it is in a substantially vertical position. Thus, the cable management system 10 now contains all of the cables inserted into cable portals 28 and organizes the cables in a neat and efficient manner within the releasable retaining members 22 such that all cables are directed towards one or both sides of the flat panel monitor display in an orderly fashion.

While embodiments and applications of this system have been shown and described, it would be apparent to those skilled in the art that many more modifications than mentioned above are possible without departing from the inventive concepts herein. The system, therefore, is not to be restricted except in the spirit of the appended claims.

What is claimed is:

1. A method of managing cables of an electronic device comprising:

providing an electronic device having a front surface and a rear surface, said rear surface having a plurality of downwardly facing cable portals;

providing a support member rotatably coupled to said rear surface of said electronic device through a rotatable joining member;

providing a plurality of releasably connectable retaining members coupled to said rear surface of said electronic device;

providing a plurality of cables; and coupling at least one of said plurality of cables between said plurality of cable portals of said electronic device and said plurality of releasably connectable retaining members.

2. The method of managing cable according to claim 1 wherein said front and rear surfaces of said electronic device are rotated 90° on a substantially horizontal axis when coupling said plurality of cables between said plurality of cable portals of said electronic device and said plurality of releasably connectable retaining members.

3. The method of managing cable according to claim 2 further comprising providing a support member rotatable coupled to said rear surface of said flat panel monitor assembly through a rotatable joining member, wherein said front and rear surfaces of said flat panel monitor are rotated 90° on a horizontal axis when coupling said plurality of cables between said plurality of cable portals of said electronic device and said plurality of releasably connectable retaining members.

4. A method of managing cables comprising:

providing a flat panel monitor assembly having a front surface and a right side surface, a left side surface, and a rear surface, said rear surface having a plurality of downwardly facing cable portals;

providing a plurality of releasably connectable retaining members coupled to said rear surface of said flat panel monitor assembly;

providing a plurality of cables; and coupling at least one of said plurality of cables between said plurality of cable portals of said flat panel monitor assembly and said plurality of releasably connectable retaining members.

5. The method according to claim 4 wherein the rear surface of said flat panel monitor has an upper planar surface and a lower planar surface perpendicular to said right side surface and said left side surface of said flat panel monitor;

said upper planar surface having a greater width than said lower planar surface and having a bottom surface; and wherein said plurality of downwardly facing cable portals are disposed about said bottom surface and having said plurality of releasably connectable retaining members disposed about said lower planar surface.

6. The method of claim 4 wherein the providing releasably connectable retaining members further comprises coupling the releasably connectable retaining members to said rear surface so that the releasably connectable members form a substantially horizontal line.

7. A method of managing cables comprising:

providing a flat panel monitor assembly having a front surface and a right side surface, a left side surface, and a rear surface, said rear surface having a plurality of downwardly facing cable portals;

providing a support member rotatably coupled to said rear surface of said flat panel monitor assembly through a rotatable joining member;

providing a releasably connectable retaining member coupled to said rear surface of said flat panel monitor assembly;

providing a plurality of cables; and coupling at least one of said plurality of cables between said plurality of cable portals of said flat panel monitor assembly and said releasably connectable retaining member.

8. A method of managing a plurality of cables of an electronic device having a rear surface, the rear surface having a plurality of downwardly facing cable portals, the method comprising:

coupling a releasably connectable retaining member to the rear surface;

connecting one end of each of the plurality of cables to the downwardly facing cable portals; and, placing a portion of the plurality of cables on the releasably connectable retaining member.

9. The method of claim 8 further comprising rotatably coupling the electronic device to a support device and rotating the rear surface of the electronic device.

10. The method of claim 8 wherein the coupling step further comprises coupling a plurality of releasably connectable retaining members to the rear surface so that the releasably connectable members form a substantially horizontal line and the placing step further comprises placing a portion of the plurality of cables on the plurality of releasably connectable retaining members so that the cables are situated along the substantially horizontal line.

* * * * *